(12) United States Patent
Suzuki et al.

(10) Patent No.: US 7,078,873 B2
(45) Date of Patent: Jul. 18, 2006

(54) MOTOR CONTROLLER

(75) Inventors: Hiroshi Suzuki, Okazaki (JP); Yutaka Mori, Toyohashi (JP)

(73) Assignees: Favess Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/038,195

(22) Filed: Jan. 21, 2005

(65) Prior Publication Data
US 2005/0156549 A1    Jul. 21, 2005

(30) Foreign Application Priority Data
Jan. 21, 2004  (JP)  ............. 2004-013628

(51) Int. Cl.
*H02K 23/16*  (2006.01)
(52) U.S. Cl. ............ 318/437; 318/466; 318/445
(58) Field of Classification Search ............. 318/437, 318/254, 138, 439, 466, 445
See application file for complete search history.

(56) References Cited

U.S. PATENT DOCUMENTS

| 5,729,102 | A | * | 3/1998 | Gotou et al. | ............. 318/254 |
| 5,777,447 | A | * | 7/1998 | Okano | ............. 318/434 |
| 6,049,182 | A | * | 4/2000 | Nakatani et al. | ............. 318/432 |
| 6,081,087 | A | * | 6/2000 | Iijima et al. | ............. 318/439 |
| 6,462,491 | B1 | * | 10/2002 | Iijima et al. | ............. 318/254 |
| 6,838,844 | B1 | * | 1/2005 | Shimizu et al. | ............. 318/287 |
| 6,911,794 | B1 | * | 6/2005 | Maslov et al. | ............. 318/437 |
| 2004/0145330 | A1 | * | 7/2004 | Maslov et al. | ............. 318/437 |

FOREIGN PATENT DOCUMENTS

JP    2001-178199    6/2001

* cited by examiner

*Primary Examiner*—Rita Leykin
(74) *Attorney, Agent, or Firm*—Oblon, Spivak, McClelland, Maier & Neustadt, P.C.

(57) ABSTRACT

A controller for a brushless motor that suppresses torque reduction resulting from the influence of motor inductance and suppresses the generation of invalid current. A phase advancing angle calculator calculates a delay angle of phases of phase currents with respect to the phases of the phase voltage command and a phase advancing angle corresponding to the delay angle based on the function of the angular velocity and the motor inductance (and armature winding resistance) of the brushless motor. An adder adds the phase advancing angle to the rotation angle provided from the rotation angle calculator to generate the corrected rotation angle. The adder further provides the corrected rotation angle to a two-phase/three-phase converter.

10 Claims, 7 Drawing Sheets

MOTOR CONTROLLER

CROSS-REFERENCE TO RELATED APPLICATION

This application is based upon and claims the benefit of priority from prior Japanese Patent Application No. 2004-013628, filed on Jan. 21, 2004, the entire contents of which are incorporated herein by reference.

BACKGROUND OF THE INVENTION

The present invention relates to a controller for a motor, and more specifically, to a controller for a brushless motor.

In a conventional method for controlling the torque of a three phase brushless motor, current values of three phases U, V, and W (phase current values) are d/q converted to generate d-axis current value and q-axis current value in accordance with a d-q coordinate system. Further, feedback control is performed based on the difference of the d-axis current value and q-axis current value from d-axis current command value and q-axis current command value (target values). The d-axis voltage command value and the q-axis voltage command value are converted back to the phase current command values of three phases U, V and W (d/q inverse conversion) to generate a motor control signal based on the phase voltage command values.

The d-q coordinate system is an orthogonal coordinate system in which the d axis extends in the same direction as the magnetic flux of a rotor in the motor and the q axis extends in a direction orthogonal to the d axis. The d/q conversion is a procedure for calculating an alternating current as a direct current by converting the vector of each phase current supplied to the brushless motor to the d-q coordinate system.

However, in practice, the phase current values of the three phases are inaccurately converted to the d-q coordinate system. Thus, control is sometimes performed with improper coordinate axes shifted from the proper or original d-q coordinate axes in the d-q coordinate system. In this case, the value of the q-axis current on the original q-axis will be lower than the q-axis current command value. This reduces the motor torque.

Accordingly, a known motor controller (Japanese Laid-Open Patent Publication No. 2001-178199) is disclosed. The controller corrects the rotation angle that is advanced during the time difference between a current detection time and a rotation angle detection time to calculate the rotation angle used in the d/q conversion based on the average angular velocity of the motor. Then, the motor controller corrects the rotation angle that is advanced during the time difference between rotation angle detection to the next rotation angle detection to calculate the rotation angle used in the d/q inverse conversion. With such a motor controller, the d/q conversion is performed with an accurate rotation angle during the current detection. Further, the output timing of the voltage command value is matched with the timing of the next rotation angle detection. The voltage command value is accurately converted to the d-q coordinate system in order to control the q-axis current with the original d-q coordinate axes. This suppresses motor torque reduction.

In the brushless motor, however, the phase of each interline current is delayed by an angle expressed with the equation $\phi=\tan^{-1}(\omega \cdot L/R)$ with respect to the phase of each interline voltage due to the influence of the motor inductance L (and armature winding resistance R). That is, the phase of the phase current is delayed by a delay angle $\phi$ with respect to the phase of the phase voltage command (a signal including the phase voltage command value).

In other words, even if the problem caused by the rotation angle advancing within the time difference of the detection timing is solved, the control is performed on d'-q' coordinate axes shifted by the delay angle $\phi$ from the original d-q coordinate axes due to the influence of the motor inductance L, as shown in FIG. 9.

If, for example, a d-axis current command value Id* is zero, the value of the q-axis current on the original q axis, that is, the q-axis current value Iq is decreased from the q-axis current command value Iq* to Iq*cos $\phi$. The reduction of the torque that occurs in accordance with the decreasing of the q-axis current value Iq becomes significant as the angular velocity $\omega$ increases. When the three phase brushless motor is applied to an electric power steering device (EPS), the response and feeling of the steerage during sudden operation of the steering wheel may not be satisfactory.

Further, a positive d-axis current having a d-axis current value Id equivalent to the Iq*sin $\phi$ is generated by the influence of the motor inductance L. The generation of the positive d-axis current causes heating of the motor. Further when the motor has an upper limit of power supply voltage, such as an EPS motor, as a d axis interference term increases, voltage drop caused by the influence of the motor inductance L is canceled. This restricts the flow of the q-axis current and further reduces the torque.

SUMMARY OF THE INVENTION

One aspect of the present invention is a controller for controlling a three-phase brushless motor. The controller includes a three-phase/two-phase converter for converting values of three-phase current provided to the brushless motor to two-phase current values, a two-phase/three-phase converter for converting two-phase voltage command values in accordance with the difference between the two-phase current values and the two-phase current command values to generate three-phase voltage command values, a rotation angle detector for detecting rotation angle of the brushless motor, and an angular velocity calculator for calculating angular velocity of the brushless motor. A phase advancing angle calculator calculates a phase advancing angle corresponding to a delay angle of the phase of the phase current with respect to the phase of the phase voltage command resulting from influence of inductance of the motor based on a function of the angular velocity and the inductance. A rotation angle corrector adds the phase advancing angle to the rotation angle to generate a corrected rotation angle. The two-phase/three-phase converter performs two-phase/three-phase conversion using the corrected rotation angle.

Another aspect of the present invention is a controller for controlling a three-phase brushless motor. The controller includes a three-phase/two-phase converter for converting values of three phase currents provided to the brushless motor to generate two-phase current values including a d-axis current value and a q-axis current value, and a two-phase/three-phase converter for converting a d-axis voltage command value and a q-axis voltage command value to three-phase voltage command values, the d-axis voltage command value being corresponding to the difference between the d-axis current value and a d-axis current command value, and the q-axis voltage command value being corresponding to the difference between the q-axis current value and a q-axis current command value. An angular velocity calculator calculates angular velocity of the brushless motor. A condition determination circuit determines whether absolute value of the angular velocity is equal to or greater than a predetermined value. A command determination circuit determines the d-axis current command value and the q-axis current command value based on the determination of the condition determination circuit. The command determination circuit determines the d-axis current command value and the q-axis current command value from the equations of $Id^*=-|Iq0|\times\sin\Phi 0$ and $Iq^*=Iq0\times\cos\Phi 0$ if the absolute value of the angular velocity is greater than or equal to the predetermined value, where $Id^*$ represents the d-axis current command value, $Iq^*$ represents the q-axis current command value, $Iq0$ represents the input q-axis current command value, and $\Phi 0$ represents the predetermined phase advancing angle. The command determination circuit determines zero as the d-axis current command value and $Iq0$ as the q-axis current command value if the absolute value of the angular velocity is smaller than the predetermined value.

A further aspect of the present invention is a controller for controlling a three-phase brushless motor. The controller includes a three-phase/two-phase converter for converting values of three-phase currents provided to the brushless motor to generate two-phase current values including a d-axis current value and a q-axis current value, and a two-phase/three-phase converter for converting a d-axis voltage command value and a q-axis voltage command value to generate three-phase voltage command values, the d-axis voltage command value being corresponding to the difference between the d-axis current value and a d-axis current command value, and the q-axis voltage command value being corresponding to the difference between the q-axis current value and a q-axis current command value. An angular velocity calculator calculates angular velocity of the brushless motor. A condition determination circuit performs a conditional determination based on the angular velocity. A phase advancing angle calculator performs either one of a process for calculating a phase advancing angle corresponding to a delay angle of the phase of the phase current with respect to the phase of the phase voltage command resulting from influence of inductance of the motor based on a function of the angular velocity and the motor inductance and a process for using a predetermined angle as the phase advancing angle, in accordance with the determination of the condition determination circuit. A command determination circuit determines the d-axis current command value and the q-axis current command value in accordance with the phase advancing angle and an equation of $Id^*=-|Iq0|\times\sin\Phi'$ and $Iq^*=Iq0\times\cos\Phi'$ where $Id^*$ represents the d-axis current command value, $Iq^*$ represents the q-axis current command value, $Iq0$ represents the input q-axis current command value, and $\Phi'$ represents the phase advancing angle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A controller for a DC brushless motor according to a first embodiment of the present invention will now be described.

Figure 1:
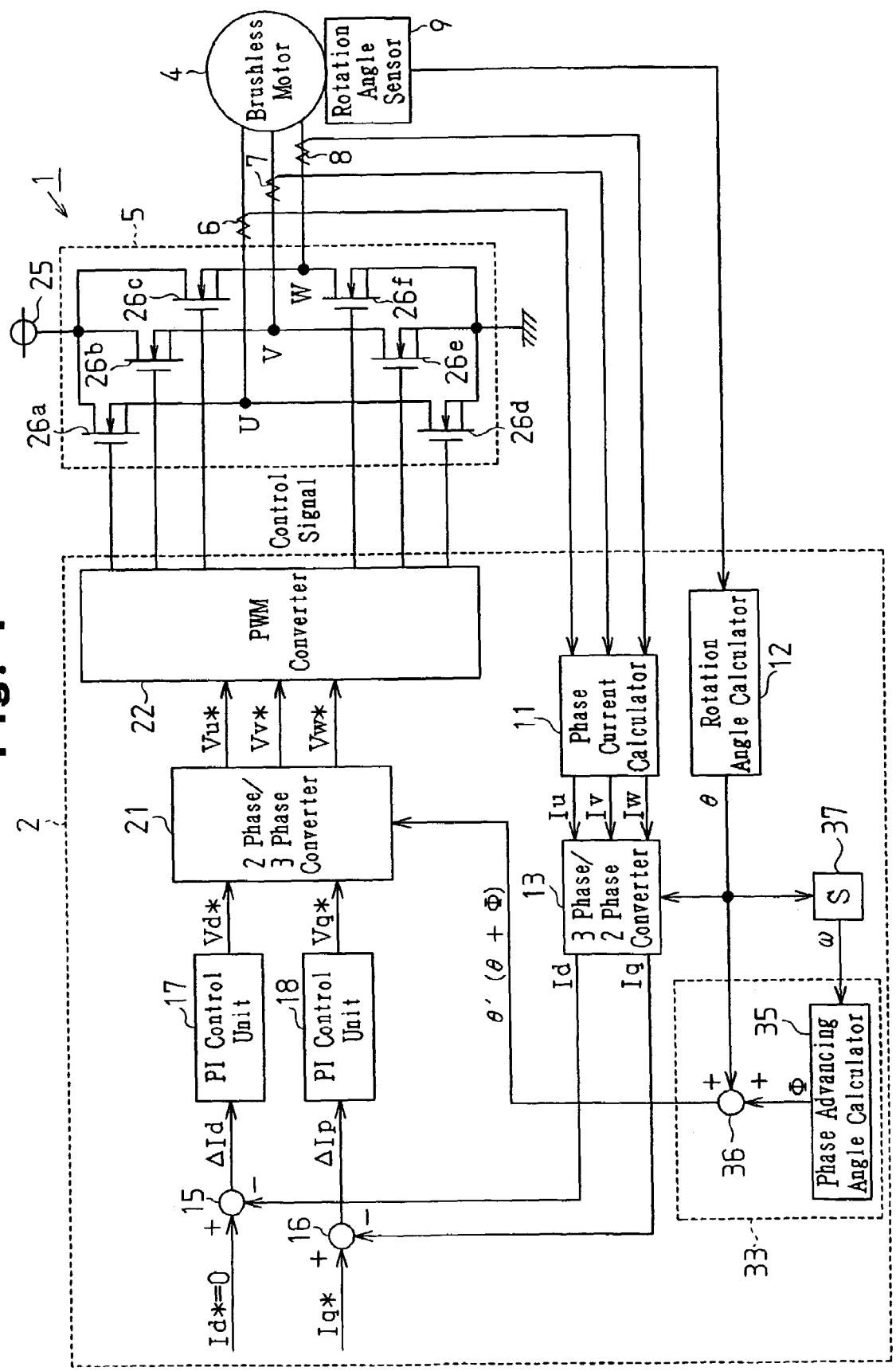
FIG. 1 is a block circuit diagram of a motor controller according to a first embodiment of the present invention.

As shown in FIG. 1, the controller 1 includes a control circuit 2, for generating a motor control signal, and an output circuit 5, for supplying drive power of three phases (U, V, and W) to a brushless motor 4 in accordance with the motor control signal.

The control circuit 2 is connected to current sensors 6, 7, and 8, which are respectively used for detecting phase current values Iu, Iv, and Iw provided to the brushless motor 4, and a rotation angle sensor 9, which detects the rotation angle θ (electric angle) of the brushless motor 4. The control circuit 2 generates the motor control signal as described below based on the detected phase current values Iu, Iv, and Iw and the rotation angle θ.

The detection signals of the current sensors 6 to 8 are provided to a phase current calculator 11. The detection signal of the rotation angle sensor 9 is provided to a rotation angle calculator 12. The phase current calculator 11 calculates the phase current values Iu, Iv, Iw based on the detection signals. The rotation angle calculator 12 calculates the rotation angle θ based on the detection signal. The phase current calculator 11 and the rotation angle calculator 12 provide the values Iu, Iv, Iw, and θ to a three-phase/two-phase converter 13.

The three-phase/two-phase converter 13 converts (d/q conversion) the phase current values Iu, Iv, Iw to a d-axis current value Id and a q-axis current value Iq in the d-q coordinate system and provides the current values Id and Iq respectively to subtracters 15 and 16.

A d-axis current command value Id* and a q-axis current command value Iq* are provided to the subtracters 15 and 16. If the brushless motor 4 is a permanent magnet synchronization motor, the d-axis current command value Id* is zero. The q-axis current command value Iq* is provided from upstream the controller 1 to the subtracter 16. If the controller 1 is applied to an electric power steering device, an upstream controller of the controller calculates the necessary assist torque based on the steering torque, vehicle velocity, rotation angle, and angular velocity. Further, the upstream controller calculates the q-axis current value to have the brushless motor 4 generate such assist torque. The calculated q-axis current value is provided to the subtracter 16 as the q-axis current command value Iq*.

The subtracter 15 calculates the difference ΔId between the d-axis current value Id and the d-axis current command value Id* and provides the difference ΔId to a PI control unit 17. Then, subtracter 16 calculates the difference ΔIq between the q-axis current value Iq and the q-axis current command value Iq* and provides the difference ΔIq to a PI control unit 18.

The PI control units 17 and 18 respectively perform proportional integral control (PI control) to generate the d-axis voltage command value Vd* and the q-axis voltage command value Vq* based on the differences ΔId and ΔIq provided from the subtracters 15 and 16 so that the d-axis current value Id and the q-axis current value Iq, which are actual currents, follow the d-axis current command value Id* and the q-axis current command value Iq*. The PI control units 17 and 18 respectively provides the d-axis voltage command value Vd* and the q-axis voltage command value Vq* to a two-phase/three-phase converter 21.

The rotation angle of the brushless motor 4 is input to the two-phase/three-phase converter 21. The two-phase/three-phase converter 21 converts the d-axis voltage command value Vd* and the q-axis voltage command value Vq* to the phase voltage command values Vu*, Vv*, and Vw* (d/q inverse conversion) of three phases based on the rotation angle. The two-phase/three-phase converter 21 provides each phase voltage command value Vu*, Vv*, and Vw* to a PWM converter 22.

The PWM converter 22 calculates the motor control signal based on each of the input phase voltage command values Vu*, Vv*, and Vw*. Then, the PWM converter 22 provides the calculated motor control signal to the output circuit 5.

The output circuit 5 is connected between a direct current power source 25 and the brushless motor 4. The output circuit 5 converts the direct current voltage provided from the direct current power source 25 to drive power of three phases (U, V, W) in accordance with the motor control signal provided from the control circuit 2, and provides the drive power to the brushless motor 4.

The output circuit 5 includes a plurality of (six) power MOSFETs (hereinafter referred to as FETs) 26a to 26f corresponding in number to the phases of the brushless motor 4. More specifically, the output circuit 5 is configured by connecting a series-connected circuit of the FETs 26a and 26d, a series-connected circuit of the FETs 26b and 26e, and a series-connected circuit of FETs 26c and 26f in parallel to one another. A node U between the FETs 26a and 26d is connected to a U-phase coil of the brushless motor 4, a node V between the FETs 26b and 26e is connected to a V-phase coil of the brushless motor 4, and a node W between the FETs 26c and 26f is connected to a W-phase coil of the brushless motor 4.

The motor control signal provided from the PWM converter 22 is applied to the gate terminals of each of the FETs 26a to 26f. Each FET 26a to 26f is activated and inactivated in response to the motor control signal and generates the drive power of the corresponding U, V, and W-phase. The drive power of the U, V, and W-phases is provided from the nodes U, V, and W to the brushless motor 4 to rotate the brushless motor 4.

The control circuit 2 includes a phase advancing control unit 33 for correcting the rotation angle θ calculated by the rotation angle calculator 12 in accordance with the angular velocity of the brushless motor 4. The phase advancing control unit 33 includes a phase advancing angle calculator 35 and an adder 36. The rotation angle θ calculated by the rotation angle calculator 12 is input to the adder 36 and a differentiator 37. The differentiator 37 calculates the angular velocity ω based on the rotation angle θ and provides the angular velocity ω to the phase advancing angle calculator 35.

The phase advancing angle calculator 35 calculates a delay angle φ of the phase of the phase current with respect to the phase of the phase voltage command based on the function ($\phi=\tan^{-1}(\omega \cdot L/R)$) of the angular velocity ω and the motor inductance L (and armature wiring resistance R). Further, the phase advancing angle calculator 35 calculates the phase advancing angle Φ corresponding to the delay angle φ. The phase advancing angle calculator 35 provides the calculated phase advancing angle Φ to the adder 36.

In the present embodiment, the relationship between the angular velocity ω and the phase advancing angle Φ is calculated in advance in accordance with the above function ($\phi=\tan^{-1}(\omega \cdot L/R)$) and stored in a memory (not shown) in the form of a map. The phase advancing angle calculator 35 refers to the map to determine the phase advancing angle Φ corresponding to the angular velocity ω.

The adder 36 adds the phase advancing angle Φ to the rotation angle θ provided from the rotation angle calculator 12 to generate a corrected rotation angle θ' and provides the corrected rotation angle θ' to the two-phase/three-phase converter 21. The two-phase/three-phase converter 21 then performs d/q inverse conversion based on the corrected rotation angle θ'.

In the present embodiment, the phase current calculator 11, the rotation angle calculator 12, the three-phase/two-phase converter 13, the subtracters 15, 16, the PI control units 17, 18, the two-phase/three-phase converter 21, the PWM converter 22, the phase advancing control unit 33, and the differentiator 37 configuring the control circuit 2 are realized by a program executed by a microcomputer.

The rotation angle calculator 12 serves as the rotation angle detector, the phase advancing control unit 33 serves as the angle corrector, and the differentiator 37 serves as the angular velocity calculator.

The first embodiment has the advantages described below.

(1) The controller 1 includes the phase advancing control unit 33, which is configured by the phase advancing angle calculator 35 and the adder 36. The phase advancing angle calculator 35 calculates the delay angle φ of the phase of the phase current with respect to the phase of the phase voltage command and the phase advancing angle Φ corresponding to the delay angle φ based on the function of the angular velocity ω and the motor inductance L (and armature wiring resistance R) of the motor that is expressed by $\phi=\tan^{-1}(\omega \cdot L/R)$. The adder 36 then adds the phase advancing angle Φ to the rotation angle θ provided from the rotation angle calculator 12 and provides the sum to the two-phase/three-phase converter 21 as the corrected rotation angle θ'.

The two-phase/three-phase converter 21 performs the d/q inverse conversion based on the corrected rotation angle θ' to generate the phase voltage command in which the phase is advanced beforehand by the phase advancing angle Φ corresponding to the delay angle φ. Since the phase of the phase current is delayed by the delay angle φ with respect to the phase voltage command in which the phase is advanced, the vector of the q-axis current matches with the original d-q coordinate axes in the d-q coordinate system. Thus, even if the angular velocity ω is increased, the value of the q-axis current is accurately controlled. As a result, the reduction of the torque by the influence of the motor inductance is prevented, and the generation of d-axis current that becomes an invalid current is also prevented.

A controller for a DC brushless motor according to a second embodiment of the present invention will now be described. Like or same reference numerals are given to those components that are the same as the corresponding components of the first embodiment and will not be described.

Figure 2:
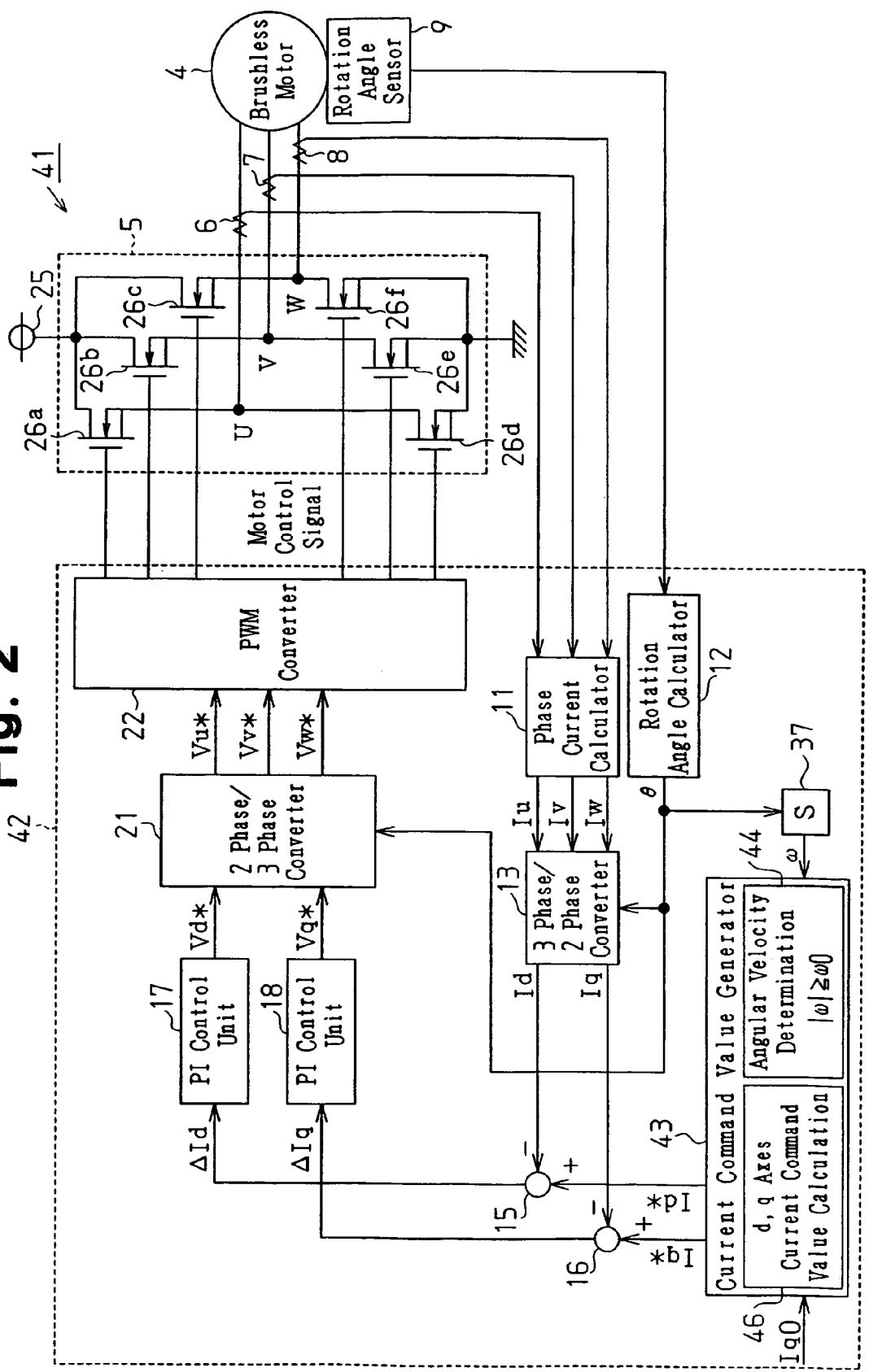
FIG. 2 is a block circuit diagram of a motor controller according to a second embodiment of the present invention.

As shown in FIG. 2, the hardware configuration of a motor controller 41 in the second embodiment is the same as the controller 1 of the first embodiment and only differs in the control block of a control circuit 42.

More specifically, in the control circuit 2 of the first embodiment, the rotation angle θ' corrected by the advancing angle Φ corresponding to the delay angle φ in accordance with the angular velocity ω is input from the phase advancing control unit 33 to the two-phase/three-phase converter 21. That is, the d/q inverse conversion is performed based on the rotation angle θ' in which the phase delay of the d-q coordinate system corrected (refer to FIG. 1). In the control circuit 42 of the second embodiment, the d-axis current command value Id* and the q-axis current command value Iq* are determined taking into consideration that the d'-q' axes for control are shifted by the delay angle φ from the original d-q axes in the d-q coordinate system. More specifically, the d-axis current command value Id* and the q-axis current command value Iq* are determined so as to generate the q-axis current value Iq on the original q axis close to a q-axis current command value Iq0 provided from the upstream of the motor controller 41 and to suppress the generation of the positive d-axis current value Id on the original d axis that becomes an invalid current.

In more detail, the control circuit 42 includes a current command value generator 43 for determining and generating the d-axis current command value Id* and the q-axis current command value Iq*. The q-axis current command value Iq0 is input to the current command value generator 43 from the upstream side of the motor controller 41. Further, the angular velocity ω is input to the current command value generator 43 from the differentiator 37. The q-axis current command value Iq0 corresponds to the q-axis current command value Iq* in the first embodiment. The current command value generator 43 generates the d-axis current command value Id* and the q-axis current command value Iq* based on the q-axis current command value Iq0 and the angular velocity ω.

In further detail, the current command value generator 43 includes an angular velocity determination circuit 44 for performing conditional determination based on the angular velocity ω, and a d, q axes current command value calculator 46 for calculating the d-axis current command value Id* and the q-axis current command value Iq* based on the determination of the angular velocity determination circuit 44.

Figure 3:
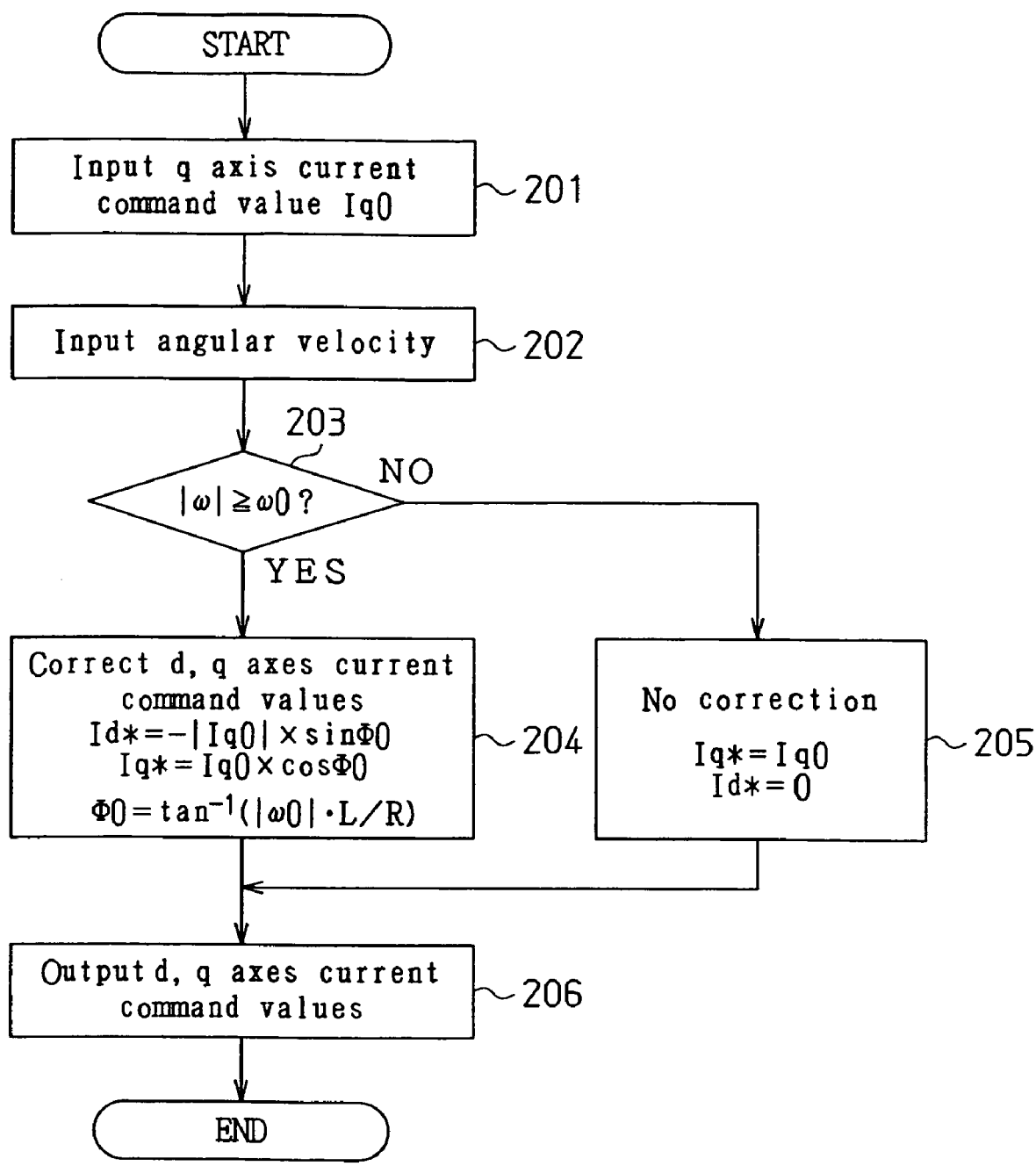
FIG. 3 is a flowchart showing control executed by a current command value generator of the controller of FIG. 2.

FIG. 3 is a flowchart of the control performed by the current command value generator 43. When the q-axis current command value Iq0 and the angular velocity ω are input to the current command value generator 43 (S201, 202), the angular velocity determination circuit 44 first determines whether the absolute value of the input angular velocity ω is greater than or equal to a predetermined threshold value, that is, an angular velocity ω0 (S203). In the second embodiment, the angular velocity ω0 is the angular velocity in which the delay angle φ becomes 19° in the above equation of φ=tan$^{-1}$(ω·L/R).

Then, if |ω|≧ω0 is satisfied in step S203 (YES in S203), the d, q axes current command value calculator 46 calculates the d-axis current command value Id* and the q-axis current command value Iq* in accordance with the equations of Id*=−|Iq0|×sin Φ0 and Iq*=Iq0×cos Φ0 (S204). The phase advancing angle Φ0 is the delay angle φ (in the second embodiment 19°) corresponding to the angular velocity ω0.

If the result is |ω|<ω0 (NO in S203), the d, q axes current command value calculator 46 calculates the d-axis current command value Id* and the q-axis current command value Iq* as Id*=0 and Iq*=0 (S205). Further, the current command value generator 43 provides the d-axis current command value Id* and the q-axis current command value Iq* calculated by the d, q axes current command value calculator 46 in step S204 or S205 to the subtracters 15 and 16, respectively (S206).

In the second embodiment, the current command value generator 43 (d, q axes current command value calculator 46) serves as a command determination circuit and the angular velocity determination circuit 44 serves as a condition determination circuit.

The operation of the second embodiment will now be described.

Figure 4:
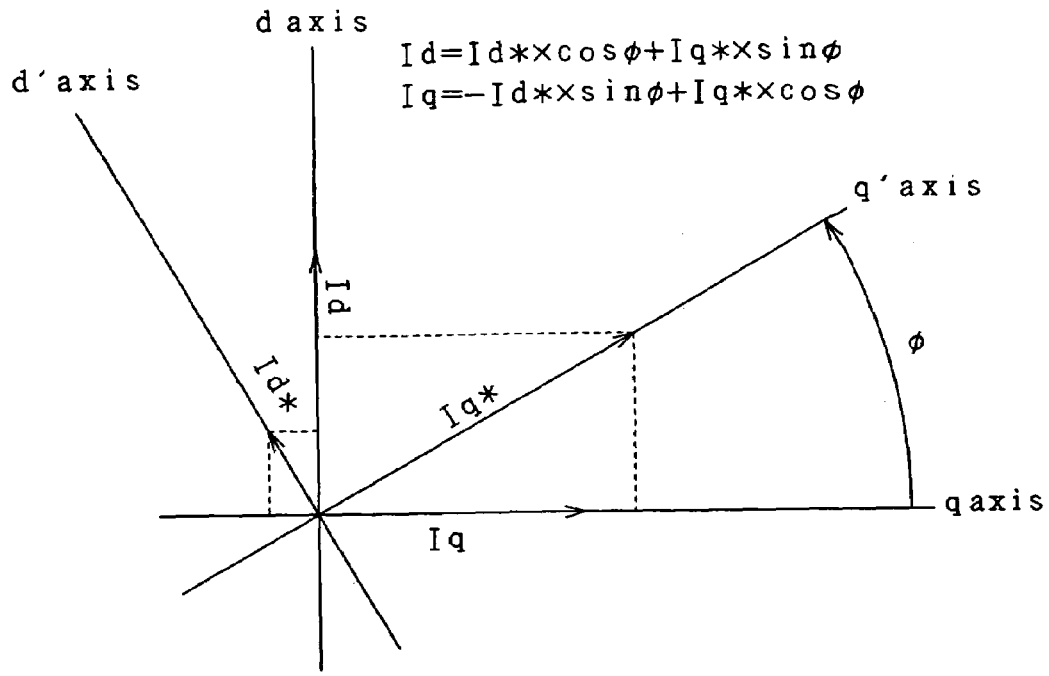
FIG. 4 is an explanatory diagram showing the relationship between the d and q axes current command values and the d and q axes current values when a phase delay occurs in the d-q coordinate system.

As shown in FIG. 4, when the angular velocity ω of the brushless motor 4 increases, the phase of the phase current is delayed by delay angle φ with respect to the phase of the phase voltage command due to the influence of the motor inductance. Thus, in the d-q coordinate system, the d'-q' coordinate axes for control is shifted by the delay angle φ from the original d-q coordinate axes.

Therefore, a d-axis current and a q-axis current having a value equivalent to the sum of the vector components (in the d axis direction and the q axis direction) of the d-axis current command value Id* and the q-axis current command value Iq* on the d'-q' coordinate axes for control are generated in the original d axis and q axis.

In other words, the d-axis current having the d-axis current value Id expressed by the equation of Id=Id*×cos φ+Iq*×sin φ is generated on the original d axis, and the q-axis current having the q-axis current value Iq expressed by the equation Iq=−Id*×sin φ+Iq*×cos φ is generated on the original q axis.

Figure 5:
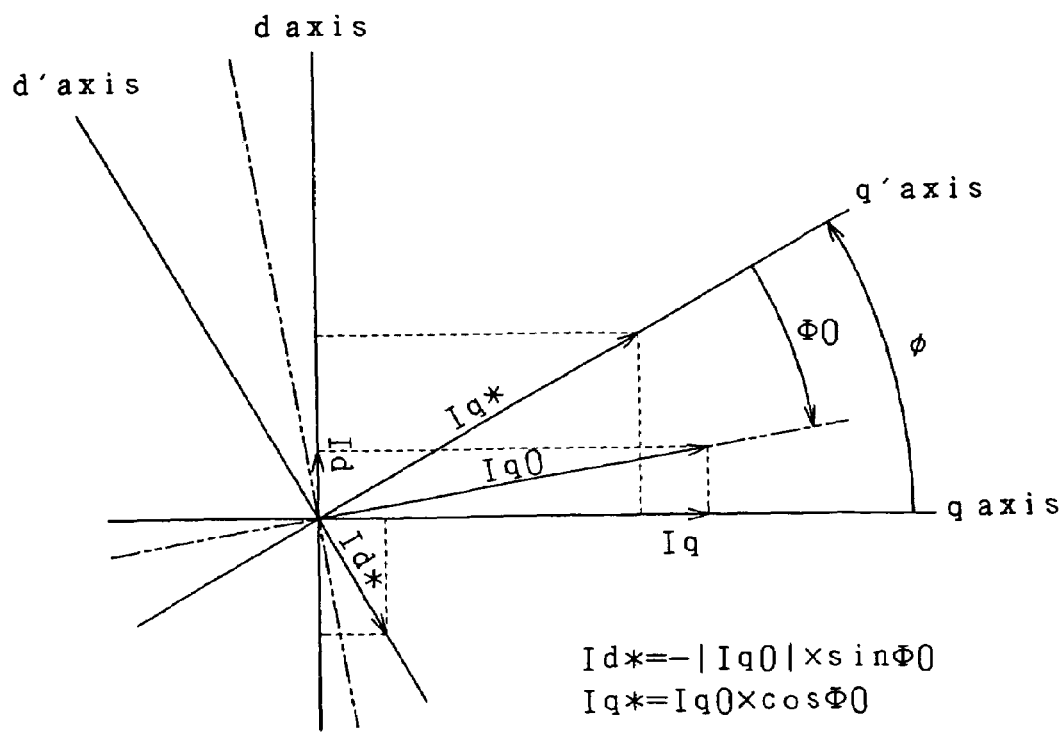
FIG. 5 is an explanatory diagram showing the operation of the second embodiment.

As shown in FIG. 5, in the second embodiment, the current command value generator 43 determines the d-axis current command value Id* and the q-axis current command value Iq* from the equations of Id*=−|Iq0|×sin Φ0 and Iq*=Iq0×cos Φ0 when the absolute value of the angular velocity ω of the brushless motor 4 is greater than or equal to the predetermined angular velocity ω0.

Therefore, the d-axis current value Id generated on the original d axis is expressed by the equation of Id=−|Iq0|×sinΦ0×cosφ+Iq0×cosΦ0×sin φ. Further, the q-axis current value Iq generated on the original q axis is expressed by the equation of Iq=|Iq0|×sin Φ0×sin φ+Iq0×cos Φ0×cos φ.

In summary, the d-axis current value Id on the original d axis is expressed by the equation of Id=|Iq0|×sin(φ−Φ0), and the q-axis current value Iq on the original q axis is expressed by the equation Iq=Iq0×sin(φ−Φ0).

This is equivalent to improving the shift of the d'-q' coordinate axes for control with respect to the original d-q coordinate axes to an angle expressed by (φ−Φ0). Therefore, a q-axis current having a value close to the q-axis current command value Iq0 provided from the upstream side is generated on the original q axis. As a result, torque reduction caused by the influence of the motor inductance is suppressed, and the generation of positive d-axis current that becomes an invalid current in the original d axis is suppressed.

The second embodiment has the advantages described below.

(1) The motor controller 41 includes the angular velocity determination circuit 44, for performing conditional determination based on the angular velocity ω, and the d, q axes current command value calculator 46, for calculating the d-axis current command value Id* and the q-axis current command value Iq* based on the above determination. Further, the motor controller 41 includes the current command value generator 43 for determining the d-axis current command value Id* and the q-axis current command value Iq* based on the q-axis current command value Iq0 and the angular velocity ω. The d, q axes current command value calculator 46 calculates the d-axis current command value Id* and the q-axis current command value Iq* in accordance with the equations of Id*=−|Iq0|×sin Φ0 and Iq*=Iq0×cos Φ0 when |ω|≧ω0 is satisfied.

Thus, d-axis current expressed by the equation Id=|Iq0|× sin(φ−Φ0) is generated on the original d axis, and the q-axis current expressed by the equation Iq=Iq0×cos(φ−Φ0) is generated on the original q axis. This is equivalent to improving the shift of the d'-q' coordinate axes for control with respect to the original d-q coordinate axes to an angle expressed by (φ−Φ0). Therefore, q-axis current having a value close to the q-axis current command value Iq0 provided from the upstream side is generated on the original q axis. Also, torque close to the target value is generated, even when the angular velocity ω increases, while suppressing torque reduction caused by the influence of the motor inductance. Further, the generation of positive d-axis current on the original d axis is suppressed, and the reduction of q-axis current when the motor is heated or when the d axis interference term is increased is prevented.

(2) The d, q axes current command value calculator 46 uses the predetermined value, which is set in advance, as the phase advancing angle Φ0 when calculating the d-axis current command value Id* and the q-axis current command value Iq*. Further, when |ω|<ω0 is satisfied, the d-axis current command value Id* and the q-axis current command value Iq* is calculated as Id*=0 and Iq*=0.

In this configuration, the calculation load is small compared to when sequentially calculating the phase advancing angle in response to the angular velocity ω. Further, the necessary memory capacity is small compared to when storing a map associating the angular velocity ω and the phase advancing angle in the memory. Therefore, an inexpensive microcomputer having low computing power or small memory capacity may be used. This reduces costs.

A controller for a DC brushless motor according to a third embodiment of the present invention will now be described. Like or same reference numerals are given to those components that are the same as the corresponding components of the second embodiment and will not be described.

Figure 6:
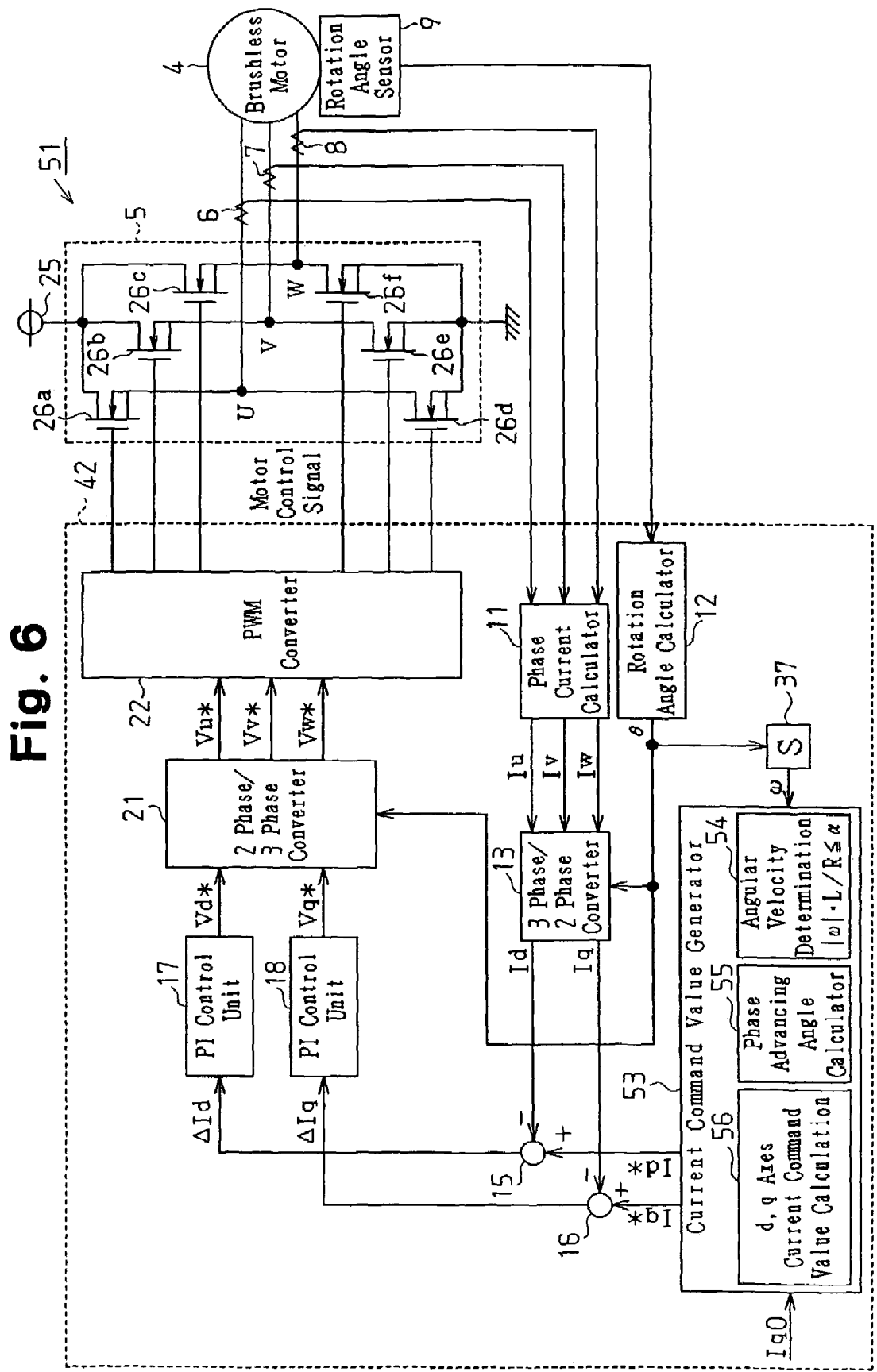
FIG. 6 is a block circuit diagram of a motor controller according to a third embodiment of the present invention.

A motor controller 51 shown in FIG. 6 only differs from the motor controller 41 of the second embodiment in a current command value generator 53. The current command value generator 53 includes an angular velocity determination circuit 54, for performing conditional determination based on the angular velocity ω, a phase advancing angle calculator 55, for calculating the phase advancing angle Φ', and a d, q axes current command value calculator 56 for calculating the d-axis current command value Id* and the q-axis current command value Iq* based on the calculated phase advancing angle Φ'.

Figure 7:
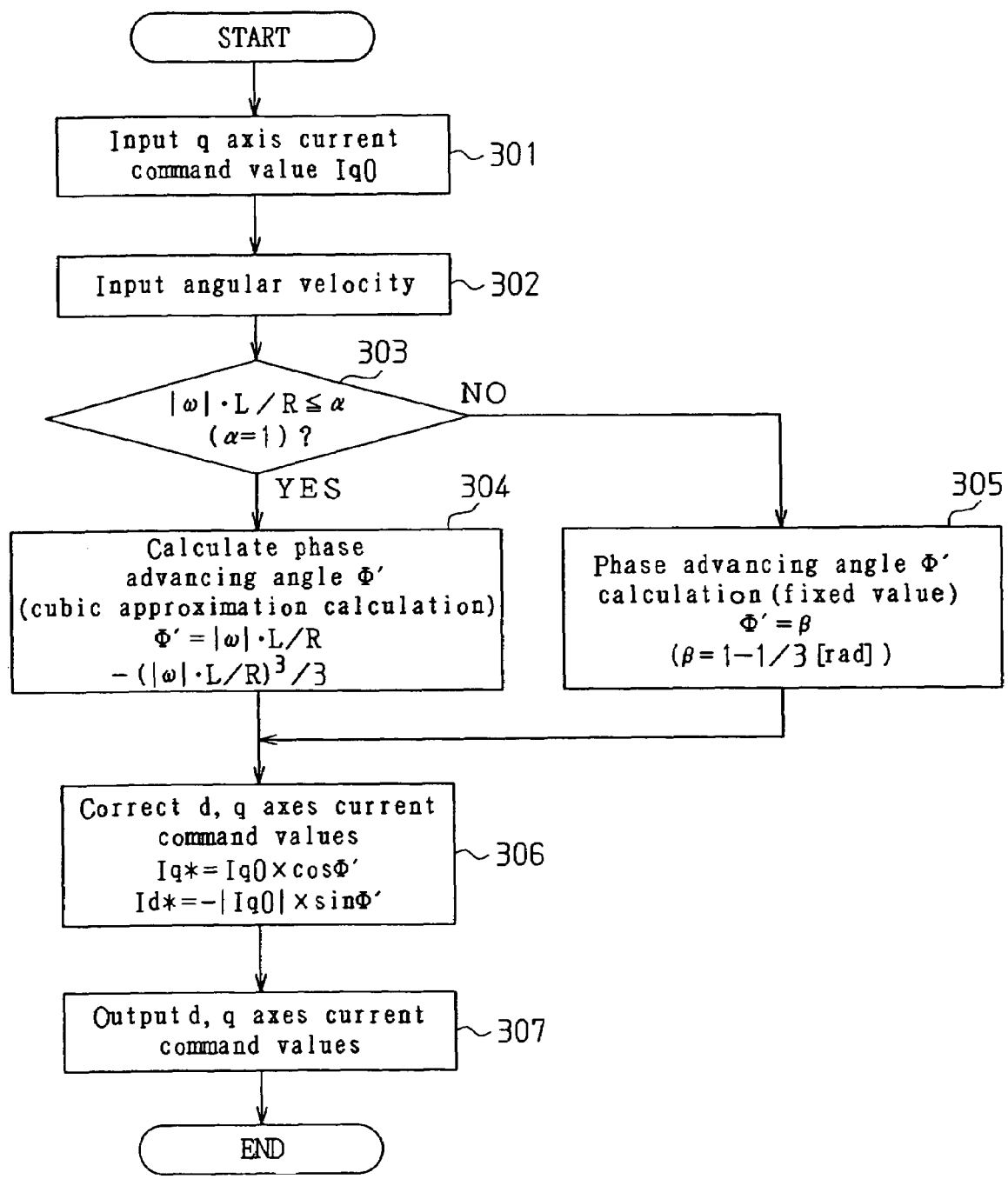
FIG. 7 is a flowchart showing the control executed by a current command value generator of the controller of FIG. 6.

As shown in FIG. 7, when the q-axis current command value Iq0 and the angular velocity ω are input to the current command value generator 53 (S301, 302), the angular velocity determination circuit 54 first determines whether |ω|·L/R is less than or equal to a predetermined value α (in the third embodiment α=1) that is set in advance (S303) The phase advancing angle calculator 55 then calculates the phase advancing angle Φ' in accordance with the determination of the angular velocity determination circuit 54 (S304, S305).

More specifically, when the angular velocity determination circuit 54 determines that |ω|·L/R≦α is satisfied in step S303 (YES in S303), the phase advancing angle calculator 55 calculates the delay angle φ of the phase of the phase current with respect to the phase of the phase voltage command based on the function of the angular velocity ω and the motor inductance L and calculates the phase advancing angle Φ' corresponding to the delay angle φ (S304). When |ω|·L/R>α is satisfied (NO in S303), a predetermined value (angle) β is used as the phase advancing angle Φ' (S305).

Figure 8:
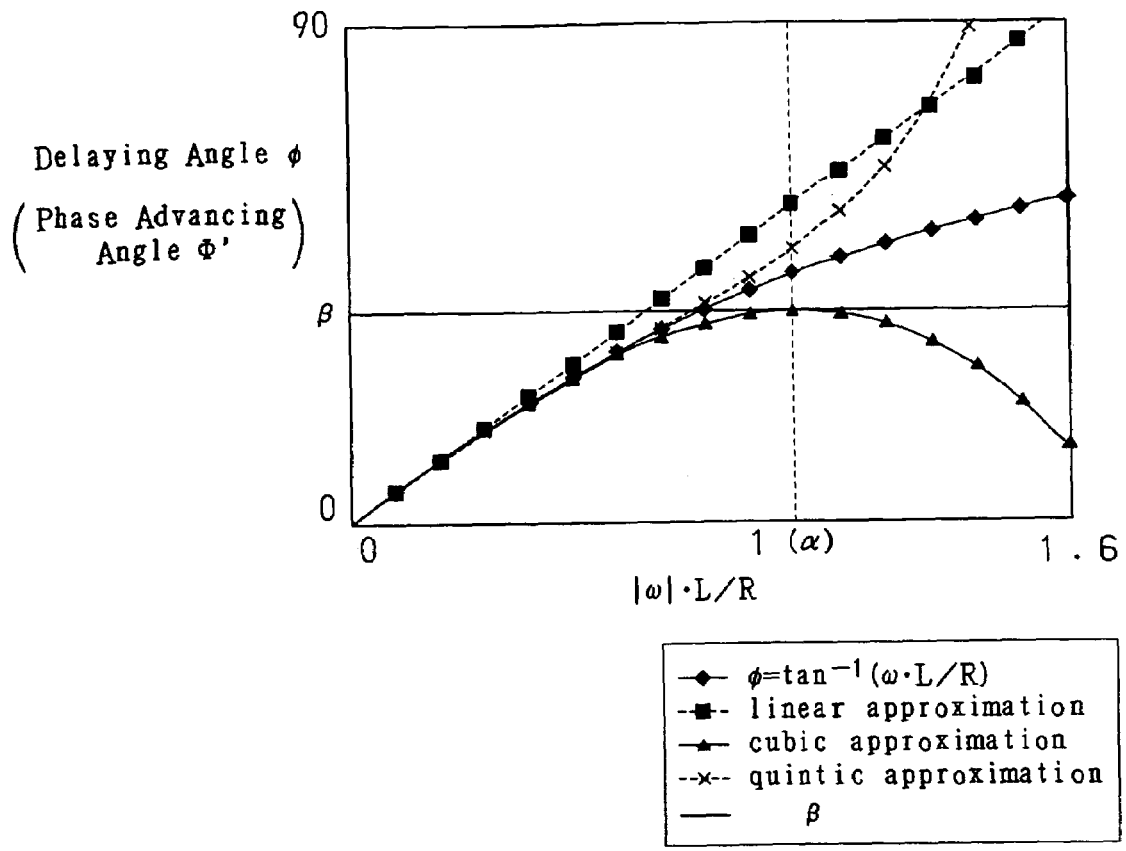
FIG. 8 is an explanatory diagram showing the calculation performed by a phase advancing angle calculator of the third embodiment.
Figure 9:
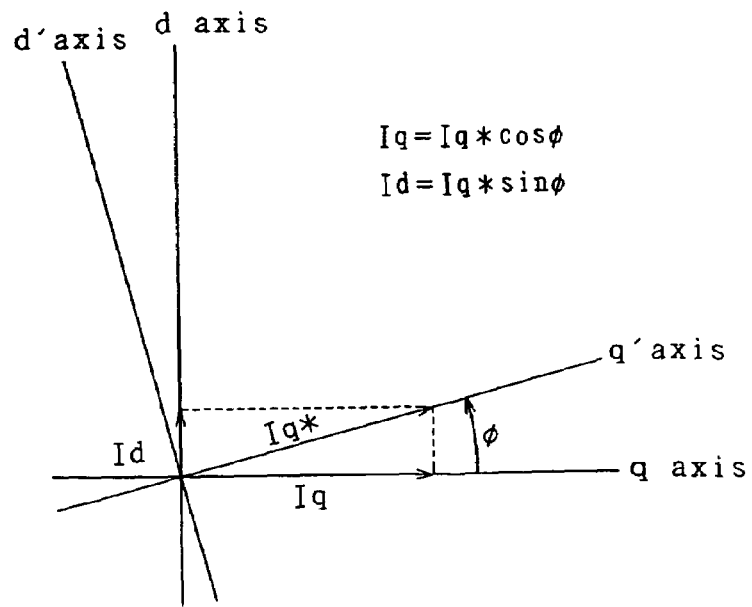
FIG. 9 is an explanatory diagram showing delay of a phase in the d-q coordinate system caused by the influence of the motor inductance.

In the third embodiment, the phase advancing angle calculator 55 calculates the phase advancing angle Φ' from the cubic approximation of φ=tan −1(ω·L/R), that is, Φ'=|ω|·L/R−(|ω|·L/R)$^3$/3 in step S304. In step S305, the predetermined value β serving as the phase advancing angle Φ' is a value (β=1−⅓[rad]) equivalent to the phase advancing angle Φ' (38.2°) corresponding to the predetermined value α (α=1) (refer to FIG. 8).

Next, based on the phase advancing angle Φ' calculated by the phase advancing angle calculator 55 in step S304 or step S305, the d, q axes current command value calculator 56 calculates the d-axis current command value Id* and the q-axis current command value Iq* in accordance with the equations of Id*=−|Iq0|×sin Φ' and Iq*=Iq0×cos Φ' (S306). The current command value generator 53 then provides the d-axis current command value Id* and the q-axis current command value Iq* to the subtracters 15, 16, respectively (S307).

In the third embodiment, the current command value generator 53 (d, q axes current command value calculator 56) serves as the command determination circuit, and the angular velocity determination circuit 54 serves as the condition determination circuit.

The third embodiment has the advantages described below.

(1) The angular velocity determination circuit 54 determines whether |ω|·L/R is less than or equal to the predetermined value α. The phase advancing angle calculator 55 calculates the phase advancing angle Φ' based on the function of the angular velocity ω and the motor inductance L (and armature wiring resistance R) when |ω|·L/R≦α is satisfied. If |ω|·L/R>α is satisfied, the phase advancing angle calculator 55 determines the predetermined value β, which is set in advance, as the phase advancing angle Φ'. Further, the d-axis current command value Id* and the q-axis current command value Iq* are calculated from the equations of Id*=−|Iq0|×sin Φ' and Iq*=Iq0×cos Φ' based on the phase advancing angle Φ' calculated by the phase advancing angle calculator 55.

In the same manner as the second embodiment, this configuration is equivalent to improving the shift of the d'-q' coordinate axes for control to an angle expressed by (φ-Φ') with respect to the original d-q coordinate axes. Further, by switching the calculation mode of the phase advancing angle Φ' in accordance with the conditional determination based on the angular velocity ω, the d-axis current command value Id* and the q-axis current command value Iq* are accurately determined so that the q-axis current command value Iq0, provided from the upstream side to the original q axis, and the q-axis current value Iq match in the normally used angular velocity region. This reduces the computation load or the memory capacity in the non-normally used angular velocity region. Therefore, torque reduction and the generation of invalid current due the influence of the motor inductance may accurately be suppressed, while lowering cost using an inexpensive microcomputer having low computation power or small memory capacity.

(2) The phase advancing angle calculator 55 calculates the phase advancing angle $\Phi'$ from the cubic approximation of $\phi=\tan^{-1}(\omega \cdot L/R)$ or $\Phi'=|\omega|\cdot L/R-(|\omega|\cdot L/R)^3/3$. Therefore, the computation load is further reduced.

It should be apparent to those skilled in the art that the present invention may be embodied in many other specific forms without departing from the spirit or scope of the invention. Particularly, it should be understood that the present invention may be embodied in the following forms.

In each embodiment, three current sensors 6 to 8 are used to detect the phase current value Iu, Iv, Iw. However, the present invention is not limited to such a configuration, and any two-phase currents may be detected from the phase current values Iu, Iv, and Iw with two current sensors, and the remaining phase current may be detected from the detected two-phase currents through a calculation.

In the first embodiment, the relationship between the angular velocity $\omega$ and the phase advancing angle $\Phi$ is calculated in advance from the equation of $\phi=\tan^{-1}(\omega \cdot L/R)$ and stored in a memory (not shown) in the form of a map. The phase advancing angle calculator 35 determines the phase advancing angle $\Phi$ corresponding to the angular velocity $\omega$ that is input by referring to the map. However, the present invention is not limited to such a configuration, and the phase advancing angle $\Phi$ corresponding to the input angular velocity $\omega$ may be sequentially calculated with the equation $\phi=\tan^{-1}(\omega \cdot L/R)$ or may be calculated from the approximation of $\phi=\tan^{-1}(\omega \cdot L/R)$ as in the phase advancing angle calculator 55 of the third embodiment.

In the first embodiment, the phase advancing control unit 33 adds the phase advancing angle $\phi$, which is calculated based on the function of the angular velocity $\omega$ and the motor inductance L (and armature wiring resistance R), to the rotation angle $\theta$, which is calculated by the rotation angle calculator 12, and provides the sum to the two-phase/three-phase converter 3 as the corrected rotation angle $\theta'$. However, the present invention is not limited to such a configuration, and a predetermined phase advancing angle set in advance may be added to the rotation angle $\theta$ calculated by the rotation angle calculator 12.

In such case, a condition determination circuit for performing a conditional determination based on the angular velocity $\omega$ may be used like in the angular velocity determination circuits 44 and 54 of the second and the third embodiments. Further, in accordance with the determination, the phase advancing calculator may calculate the phase advancing angle based on the above function or may use a predetermined value as the phase advancing angle. Alternatively, calculation of the phase advancing angle may be eliminated.

In the second and third embodiments, the angular velocity determination circuits 44 and 54 respectively include the current command value generators 43 and 53. However, the present invention is not limited to such a configuration, and the angular velocity determination circuit may be omitted so that the d-axis current command value Id* and the q-axis current command value Iq* are determined from a uniform calculation mode irrespective of the angular velocity $\omega$ as in the phase advancing control unit 33 of the first embodiment. In this case, the d-axis current command value Id* and the q-axis current command value Iq* may be determined by using the phase advancing angle calculated based on the above function or by using the predetermined phase advancing angle.

In the second embodiment, the predetermined angular velocity $\omega 0$ is set to a value corresponding to the angular velocity $\omega$ in which the delay angle $\phi$ is 19° in the expression of $\phi=\tan^{-1}(\omega \cdot L/R)$, and the phase advancing angle $\Phi 0$ is set to 19° in correspondence with the delay angle $\phi$. However, the predetermined angular velocity $\omega 0$ and the phase advancing angle $\Phi 0$ may be set to any value.

In the second embodiment, the current command value generator 43 may determine the d-axis current command value Id* and the q-axis current command value Iq* from the equations of Id*=−|Iq0|×sin $\Phi 0$ and Iq*=Iq0×cos $\Phi 0$ when $|\omega| \leq \omega 0$ is satisfied. Further, if $|\omega| >> \omega 0$ is satisfied, the d-axis current command value Id* and the q-axis current command value Iq* may be determined as Id*=0, Iq*=Iq0. This is the same for when the condition determination circuit is arranged in the phase advancing control unit of the first embodiment.

In the third embodiment, the predetermined value $\alpha$ is set as $\alpha=1$, and the predetermined value $\beta$ is set to a value ($\beta=1-\frac{1}{3}$[rad]) equivalent to the phase advancing angle $\Phi'$ (38.2°) corresponding to $\alpha=1$. However, but the predetermined value $\alpha$ and the predetermined value $\beta$ may be set to any value.

In the third embodiment, the phase advancing angle calculator 55 calculates the phase advancing angle $\Phi'$ from the cubic approximation of $\phi=\tan^{-1}(\omega \cdot L/R)$. However, the present invention is not limited to such a configuration, and the phase advancing angle $\Phi'$ may be calculated from a primary approximation or from an approximation that is greater than or equal to a quintic approximation, and the phase advancing angle $\Phi$ corresponding to the input angular velocity $\omega$ may be sequentially calculated from the equation $\phi=\tan^{-1}(\omega \cdot L/R)$. Further, like in the phase advancing angle calculator 35 of the first embodiment, it may be determined from the map stored in the memory.

In the third embodiment, the angular velocity determination circuit 54 determines whether the $|\omega|\cdot L/R$ is less than or equal to a predetermined value $\alpha$ (in the third embodiment $\alpha=1$). However, the present invention is not limited to such a configuration, and the angular velocity determination circuit may perform the determination based on whether the absolute value of the angular velocity $\omega$ is less than or equal to a predetermined value.

In the third embodiment, the phase advancing angle calculator 55 calculates the phase advancing angle $\Phi'$ based on the above function when the angular velocity determination circuit 54 is $|\omega|\cdot L/R \geq \alpha$ and calculates the predetermined value $\beta$ as the phase advancing angle $\Phi'$ when $|\omega|\cdot L/R < \alpha$ is satisfied. This is the same for when the condition determination circuit is arranged in the phase advancing control unit in the first embodiment.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A controller for controlling a three-phase brushless motor, the controller comprising:
   a three-phase/two-phase converter for converting values of three-phase current provided to the brushless motor to two-phase current values;

a two-phase/three-phase converter for converting two-phase voltage command values in accordance with a difference between the two-phase current values and the two-phase current command values to generate three-phase voltage command values;
a rotation angle detector for detecting rotation angle of the brushless motor;
an angular velocity calculator for calculating angular velocity of the brushless motor;
a conditional determination circuit for determining whether an absolute value of the calculated angular velocity is equal to or greater than a predetermined value;
a phase advancing angle calculator for calculating a phase advancing angle corresponding to a delay angle of the phase of the phase current with respect to the phase of the phase voltage command resulting from influence of inductance of the motor based on a function of the angular velocity and the inductance; and
a rotation angle corrector for adding the phase advancing angle to the rotation angle to generate a corrected rotation angle, wherein the two-phase/three-phase converter performs two-phase/three-phase conversion using the corrected rotation angle.

2. A controller for controlling a three-phase brushless motor, the controller comprising:
a three-phase/two-phase converter for converting values of three-phase current provided to the brushless motor to two-phase current values;
a two-phase/three-phase converter for converting two-phase voltage command values in accordance with a difference between the two-phase current values and the two-phase current command values to generate three-phase voltage command values;
a rotation angle detector for detecting rotation angle of the brushless motor;
an angular velocity calculator for calculating angular velocity of the brushless motor;
a phase advancing angle calculator for calculating a phase advancing angle corresponding to a delay angle of the phase of the phase current with respect to the phase of the phase voltage command resulting from influence of inductance of the motor based on a function of the angular velocity and the inductance; and
a rotation angle corrector for adding the phase advancing angle to the rotation angle to generate a corrected rotation angle, wherein the two-phase/three-phase converter performs two-phase/three-phase conversion using the corrected rotation and,
wherein the function is an equation expressed by $\phi=\tan^{-1}(\omega \cdot L/R)$ or an approximation thereof, where represents the delay angle, $\omega$ represents the angular velocity, L represents the inductance, and R represents the armature winding resistance.

3. The controller as claimed in claim 2, wherein:
the phase advancing angle calculator is connected to the angular velocity calculator; and
the rotation angle corrector is connected to the two-phase/three-phase converter, the rotation angle detector, and the phase advancing angle calculator.

4. The controller as claimed in claim 2, wherein the two-phase current command values are a d-axis current command value and a q-axis current command value, the two-phase current values are a d-axis current value and a q-axis current value, and the two-phase voltage command values are a d-axis voltage command value and a q-axis voltage command value, the controller further comprising:

a first subtracter, connected to the three-phase/two-phase converter, for calculating the difference between the d-axis current value and the d-axis current command value;
a first PI control unit, connected to the first subtracter and the two-phase/three-phase converter, for generating the d-axis voltage command value;
a second subtracter, connected to the three-phase/two-phase converter, for calculating the difference between the q-axis current value and the q-axis current command value; and
a second PI control unit, connected to the second subtracter and the two-phase/three-phase converter, for generating the q-axis voltage command value.

5. A controller for controlling a three-phase brushless motor, the controller comprising:
a three-phase/two-phase converter for converting values of three phase currents provided to the brushless motor to generate two-phase current values including a d-axis current value and a q-axis current value;
a two-phase/three-phase converter for converting a d-axis voltage command value and a q-axis voltage command value to three-phase voltage command values, the d-axis voltage command value corresponding to a difference between the d-axis current value and a d-axis current command value, and the q-axis voltage command value corresponding to a difference between the q-axis current value and a q-axis current command value;
an angular velocity calculator for calculating angular velocity of the brushless motor;
a condition determination circuit for determining whether an absolute value of the angular velocity is equal to or greater than a predetermined value; and
a command determination circuit for determining the d-axis current command value and the q-axis current command value based on the determination of the condition determination circuit, wherein the command determination circuit:
determines the d-axis current command value and the q-axis current command value from the equations of $Id^*=-|Iq0|\times\sin \Phi0$ and $Iq^*=Iq0\times\cos \Phi0$ if the absolute value of the angular velocity is greater than or equal to the predetermined value, where Id* represents the d-axis current command value, Iq* represents the q-axis current command value, Iq0 represents the input q-axis current command value, and $\Phi0$ represents the predetermined phase advancing angle, and
determines zero as the d-axis current command value and Iq0 as the q-axis current command value if the absolute value of the angular velocity is smaller than the predetermined value.

6. The controller as claimed in claim 5, further comprising:
a first subtracter, connected to the three-phase/two-phase converter and the command determination circuit, for calculating a difference between the d-axis current value and the d-axis current command value;
a first PI control unit, connected to the first subtracter and the two-phase/three-phase converter, for generating the d-axis voltage command value;
a second subtracter, connected to the three-phase/two-phase converter and the command determination circuit, for calculating a difference between the q-axis current value and the q-axis current command value; and a second PI control unit, connected to the second subtracter and the two-phase/three-phase converter, for generating the q-axis voltage command value;

wherein the rotation angle detector is connected to the three-phase/two-phase converter, the two-phase/three-phase converter, and the angular velocity calculator.

7. A controller for controlling a three-phase brushless motor, the controller comprising:

a three-phase/two-phase converter for converting values of three-phase currents provided to the brushless motor to generate two-phase current values including a d-axis current value and a q-axis current value;

a two-phase/three-phase converter for converting a d-axis voltage command value and a q-axis voltage command value to generate three-phase voltage command values, the d-axis voltage command value being corresponding to a difference between the d-axis current value and a d-axis current command value, and the q-axis voltage command value being corresponding to a difference between the q-axis current value and a q-axis current command value;

an angular velocity calculator for calculating angular velocity of the brushless motor;

a condition determination circuit for performing a conditional determination based on the angular velocity; and a phase advancing angle calculator for performing either one of a process for calculating a phase advancing angle corresponding to a delay angle of the phase of the phase current with respect to the phase of the phase voltage command resulting from influence of inductance of the motor based on a function of the angular velocity and the motor inductance and a process for using a predetermined angle as the phase advancing angle, in accordance with the determination of the condition determination circuit; and a command determination circuit for determining the d-axis current command value and the q-axis current command value in accordance with the phase advancing angle and an equation of $Id^* = -|Iq0 \times \sin \Phi'$ and $Iq^* = Iq0 \times \cos \Phi'$ where Id* represents the d-axis current command value, Iq* represents the q-axis current command value, Iq0 represents the input q-axis current command value, and Φ' represents the phase advancing angle.

8. The controller as claimed in claim 7, wherein the function is an equation expressed by $\phi = \tan^{-1}(\omega \cdot L/R)$ or an approximation thereof, where represents the delay angle, ω represents the angular velocity, L represents the inductance, and R represents the armature winding resistance.

9. The controller as claimed in claim 7, wherein:

the condition determination circuit determines whether a value of $|\omega| \cdot L/R$ is less than or equal to a predetermined value, where ω represents the angular velocity, L represents the motor inductance, and R represents the armature winding resistance; and the phase advancing angle calculator calculates the phase advancing angle based on the function when the value of $|\omega| \cdot L/R$ is less than or equal to the predetermined value and sets the predetermined angle as the phase advancing angle when the value of $|\omega| \cdot L/R$ is greater than the predetermined value.

10. The controller as claimed in claim 7, further comprising:

a first subtracter, connected to the three-phase/two-phase converter and the command determination circuit, for calculating a difference between the d-axis current value and the d-axis current command value;

a first PI control unit, connected to the first subtracter and the two-phase/three-phase converter, for generating the d-axis voltage command value;

a second subtracter, connected to the three-phase/two-phase converter and the command determination circuit, for calculating a difference between the q-axis current value and the q-axis current command value; and a second PI control unit, connected to the second subtracter and the two-phase/three-phase converter, for generating the q-axis voltage command value;

wherein the rotation angle detector is connected to the three-phase/two-phase converter, the two-phase/three-phase converter, and the angular velocity calculator.

* * * * *